United States Patent
Tran

(10) Patent No.: US 11,263,013 B2
(45) Date of Patent: Mar. 1, 2022

(54) PROCESSOR HAVING READ SHIFTER AND CONTROLLING METHOD USING THE SAME

(71) Applicant: ANDES TECHNOLOGY CORPORATION, Hsinchu (TW)

(72) Inventor: Thang Minh Tran, Saratoga, CA (US)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 92 days.

(21) Appl. No.: 16/842,684

(22) Filed: Apr. 7, 2020

(65) Prior Publication Data
US 2021/0311741 A1    Oct. 7, 2021

(51) Int. Cl.
*G06F 9/30* (2018.01)
*G06F 1/12* (2006.01)
*G06F 1/08* (2006.01)

(52) U.S. Cl.
CPC ............ *G06F 9/30145* (2013.01); *G06F 1/08* (2013.01); *G06F 1/12* (2013.01); *G06F 9/3012* (2013.01); *G06F 9/30032* (2013.01); *G06F 9/30036* (2013.01)

(58) Field of Classification Search
CPC . G06F 9/30145; G06F 9/30036; G06F 9/3012
See application file for complete search history.

(56) References Cited

U.S. PATENT DOCUMENTS

| | | | | |
|---|---|---|---|---|
| 5,251,208 A | * | 10/1993 | Canniff | H04L 12/52 370/438 |
| 6,035,389 A | * | 3/2000 | Grochowski | G06F 9/3836 712/215 |
| 2016/0179646 A1 | * | 6/2016 | Neve De Mevergnies | G01R 31/31705 714/30 |
| 2019/0361705 A1 | * | 11/2019 | Nassi | G06F 9/3016 |

* cited by examiner

*Primary Examiner* — Zachary K Huson
(74) *Attorney, Agent, or Firm* — JCIPRNET

(57) ABSTRACT

A processor that includes a register file, a read shifter, a decode unit and a plurality of functional units is introduced. The register file includes a read port. The read shifter includes a plurality of shifter entries and is configured to shift out a shifter entry among the plurality of shifter entries every clock cycle. Each of the plurality of shifter entries is associated with a clock cycle and each of the plurality of shifter entries comprises a read value that indicates an availability of the read port of the register file for a read operation in the clock cycle. The decode unit is coupled to the read shifter and is configured to decode and issue an instruction based on the read values included in the plurality of shifter entries of the read shifter. The plurality of functional units is coupled to the decode unit and the register file and is configured to execute the instruction issued by the decode unit and perform the read operation to the read port of the register file.

25 Claims, 8 Drawing Sheets

PROCESSOR HAVING READ SHIFTER AND CONTROLLING METHOD USING THE SAME

BACKGROUND

Technical Field

The disclosure generally relates to a processor architecture, and more specifically, to a processor including a read shifter and a method for controlling an instruction pipeline of the processor.

Description of Related Art

One of approaches for improving performance of a processor is using an instruction pipeline, in which several instructions may be executed in parallel. Since the number of read ports included in a register file of a processor is limited, the assignment of many parallel issued instructions to the read ports of the register file is complex. For example, conflict may occur when several instructions to be executed in the instruction pipeline need more read ports than the available read ports in the same clock cycle, resulting in stalling and interlocking of the instructions in the instruction pipeline. As a result, the performance of the processor is degraded. The problem is worse when a vector instruction that include many micro operations are executed in the instruction pipeline.

As demand for improving performance of the processor, there has grown a need for a processor and a method of controlling the instruction pipeline that may efficiently preventing stalling and interlocking of the instructions.

SUMMARY

In one of the embodiments, a microprocessor includes a register file, a read shifter, a decode unit, and functional units. The register file includes a read port. The read shifter includes a plurality of shifter entries and configures to shift out a shifter entry among the plurality of shifter entries every clock cycle, wherein each of the plurality of shifter entries is associated with a clock cycle and each of the plurality of shifter entries comprises a read value that indicates an availability of the read port of the register file for a read operation in the clock cycle. The decode unit is coupled to the read shifter and configured to decode an instruction and issue the instruction based on the read values included in the plurality of shifter entries of the read shifter. The read shifter provides the control for reading data from register file to the functional units. The functional units are coupled to the decode unit and the register file and configured to execute the instruction issued by the decode unit and use the read data from the register file which are control by the read shifter.

In one of the embodiments, a read port of register file in a microprocessor is scheduled by using at least following steps. A first clock cycle is determined based on a read time of an instruction to be issued. An availability of the read port in the first clock cycle is determined based on a read value of a read shifter, wherein the read value is included in a shifter entry among a plurality of shifter entries of the read latency, and the plurality of shifter entries is shifted out every clock cycle. The instruction is decoded and issued when the read value of the read shifter indicates that the read port is available in the first clock cycle. The instruction is stalled when the read value of the read shifter indicates that the read port is not available in the first clock cycle.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
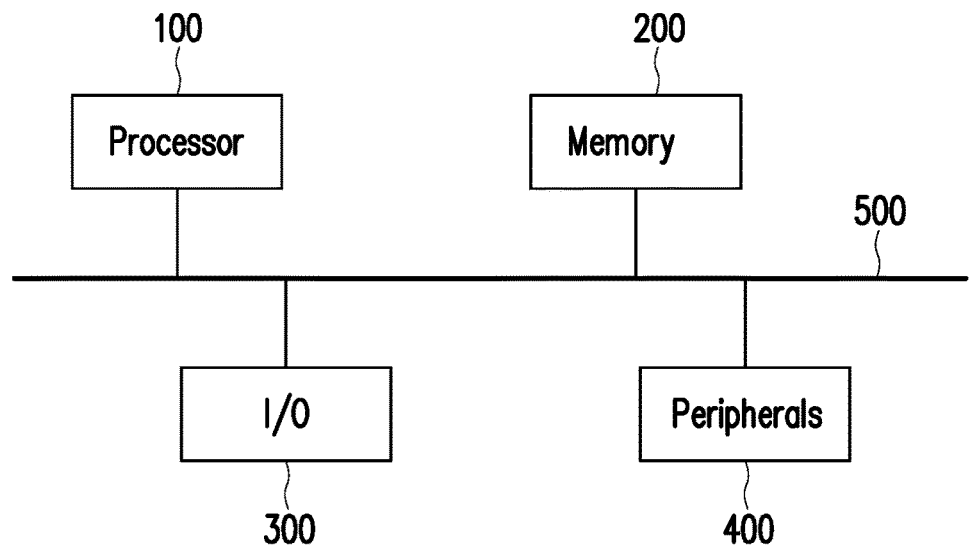
FIG. 1 is a block diagram illustrating a computer processing system in accordance with some embodiments.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a computer processing system 10 that may include a processor 100, a memory 200, an input/output (I/O) interface 300, a peripheral device 400, and a bus 500 in accordance with some embodiments. The bus 500 may allow bi-direction communications among the components of the computer processing system 10. Some embodiments of the disclosure may use more, less, or different components than those illustrated in FIG. 1. As an example, the computer processing system 10 may further include a timer, a serial peripheral interface, a digital-to-analog converter, an analog-to digital converter, a display driver, a plurality of types of memory, and any other suitable components.

In some embodiments, the processor 100 is configured to execute instructions using an instruction pipeline, in which the execution of the instruction is decomposed to several stages including an instruction fetch stage, an instruction decode stage, an instruction execution stage and a writeback stage. The processor 100 may include caches such as a data cache and an instruction cache that have relatively high access rates. The data cache for the processor 100 may be multi-level data cache that may include a L1 data cache, a L2 data cache, and a L3 data cache. The L1 data cache, the L2 data cache and the L3 data cache may be located inside or outside the processor 100. In some embodiments, the computer processing system 10 may include a plurality of processors, and any number of the processors may be the same or may be different from the processor 100.

The memory 200 is configured to store program codes of instructions and data that are needed for the execution of the instructions. The memory 200 may include non-volatile memory or volatile memory or a combination thereof. For example, the memory 200 may include at least one of random access memory (RAM), dynamic random access memory (DRAM), static random access memory (SRAM), read only memory (ROM), programmable read only memory (PROM), electrically programmable read only memory (EPROM), electrically erasable programmable read only memory (EEPROM), and flash memory.

The I/O interface 300 is configured to couple input devices and output devices to the computer systems 10 through the bus 500. The computer system 10 may receive data from the input devices and send data to the output devices through the I/O interface 300. The I/O interface 300 may include at least one of a serial connection interface and a parallel connection interface in wired or wireless connections. The peripheral device 400 may include a keyboard, a mouse, a sensor, a signal receiver, a monitor and any other suitable devices.

Figure 2:
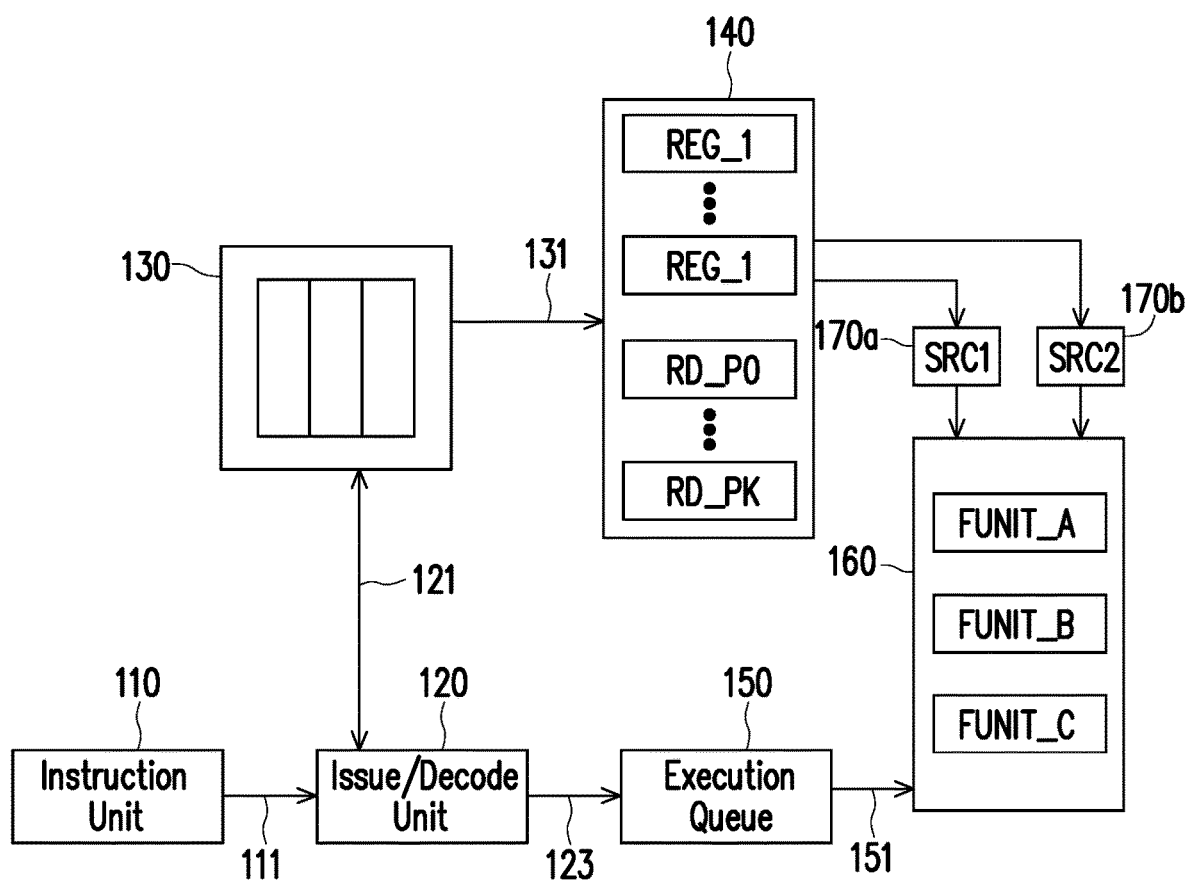
FIG. 2 is a block diagram illustrating a processor in accordance with some embodiments.

FIG. 2 illustrates a block diagram of the processor 100 in accordance with some embodiments. The processor 100 may include an instruction unit 110, an issue/decode unit 120, a read shifter 130, a register file 140, an execution queue 150 and a function unit module 160. The instruction unit 110 is configured to provide an instruction 111 for execution by the processor 100. In some embodiments, the instruction 111 may be a vector instruction that includes many micro operations with no operand, one operand, two operands or any other number of operands.

The register file 140 may include a plurality of registers REG_1 through REG_M that are configured to store data of the register file 140. The registers REG_1 through REG_M may store operands or data that are used for execution of the instruction. The number of the registers REG_1 through REG_M may vary according to the architecture of the processor 100. In some embodiments, the register file 140 further includes at least one read port RD_P0 through RD_PK from which the data stored in the registers REG_1 through REG_M are read in the read operations. In some embodiments, the register file 140 may further include at least one write port (not shown) for writing data into the register file 140.

The read shifter 130 may include a plurality of shifter entries that are shifted every clock cycle. Each shifter entry of the read shifter 130 is associated with a clock cycle (e.g., $k^{th}$ clock cycle, where k is a positive integer), and each shifter entry includes a read value (e.g., rdx[k]) that indicates an availability of a read port of the register file 140 in the clock cycle. The read value rdx[k] may be a multi-bit value or a single-bit value that indicates either the logic value of "1" and the logic value of "0". For example, when the read value rdx[k] is the logic value of "1", it indicates that read port is not available for the read operation in the $k^{th}$ clock cycle. In other words, there is another read operation that is going to be performed using the read port in the $k^{th}$ clock cycle. Alternatively, when the read value rdx[k] is the logic value of "0", it indicates that the read port is available for the read operation in the $k^{th}$ clock cycle. In some embodiments, the read values of the read shifter 130 are set upon the issuance of the instructions to be executed by the processor 100.

The issue/decode unit 120 is coupled to the instruction unit 110 and the read shifter 130 and is configured to decode and issue the instruction 111 based on the read values stored in the shifter entries of the read shifter 130. In some embodiments, when the instruction 111 is provided to the issue/decode unit 120, the issue/decode unit 120 may determine whether to stall or issue the instruction 111 that includes a read operation in $k^{th}$ clock cycle based on the read value rdx[k] of the read shifter 130. When the read value rdx[k] "0", the issue/decode unit 120 decodes and issues the instruction 111 to the execution queue 150. Upon the issuance of the instruction 111, the read value rdx[k] of the read shifter 130 is set to "1" to prevent conflict of using the read port in the $k^{th}$ clock cycle. When the read value rdx[k] of the read shifter 130 is "1", issue/decode unit 120 stalls the issuance of the instruction 111. When the read value rdx[k] is "1", it indicates that the read port is not available for the read operation of the instruction 111 in the $k^{th}$ clock cycle, thus stalling of the instructions 111 is necessary to avoid conflict in the read port. The issue/decode unit 120 may check the availability of the read port in the next clock cycle (e.g., $(k+1)^{th}$ clock cycle) by checking the read value rdx[k] of the read shifter 130. In some embodiments, the issue/decode unit 120 communicates with the read shifter 130 through a signal 121.

In some embodiments, the execution queue 150 is coupled to the issue/decode unit 120 and is configured to arrange the issued instructions in a queue. The execution queue 150 may provide the issued instruction 151 to the functional unit module 160 for execution.

The functional unit module 160 may include a plurality of functional units FUNIT_A, FUNIT_B and FUNIT_C that are configured to execute the issued instructions provided by the execution queue 150. In some embodiments, the functional unit module 160 may include an arithmetic logic unit (ALU), address generation unit (AGU), a floating-point unit (FPU), a load-store unit (LSU), branch execution unit (BEU), and other functional units. In some embodiments, each functional unit has its own execution queue. In FIG. 2, the execution queue 150 consists of three execution queues A, B, and C, one for each functional unit FUNIT_A, FUNIT_B, and FUNIT_C, respectively. In some embodiments, the instruction 151 to be executed by the functional units of the processor 100 has at least one operand that is obtained by a reading operation using the read ports of the register file 140. In some embodiments, the number of the read ports required for the instruction 151 is equal to the number of the possible source operands of the instruction 151. For example, the instruction 151 that has two operands 170*a* and 170*b* requires two read ports of the register file 130. In some embodiments, the instruction 151 is a vector instruction that include many micro operations, and each micro-operation has the same read port assigned to the same source operand of the instruction 151. By assigning the same read port to the same source operand of each micro operation of the same instruction, the control mechanism is simplified.

In some embodiments, the read ports RD_P0 through RD_PK include a plurality of shared read ports and a dedicated read port, where the shared read ports are shared for all functional units or a group of functional units 160 and the dedicated read port is dedicated to a functional unit that has unknown read time. In some embodiments, the dedicated read port may be changed to be a shared read port based on some indications. For example, the processor 100 may further include a load and store unit (not shown) that may access directly by providing the valid signal and register file address to the register file 140 by using the dedicated read port. The load and store unit of the processor 100 may provide indication of when the register read is done and indication of when there is no store in the execution queue 150. The dedicated read port may be controlled to be shared read port based on the indication of when the register read is done and the indication when there is no store in the execution queue 150. The read shifter 130 may include a store bit (not shown) to indicate that the store instruction is pending. Completion of all store instructions in the load and store unit of the processor 100 clears the store bit in the read shifter 130 at which time the dedicated read port can now be shared by other functional unit 160. Since the unknown read time instruction such as the store instruction may be assigned to the dedicated read port, the control mechanism of the processor 100 is simplified. In addition, the flexibility of the control mechanism is improved because the dedicated read port may be shared in some circumstances.

Figure 3A:
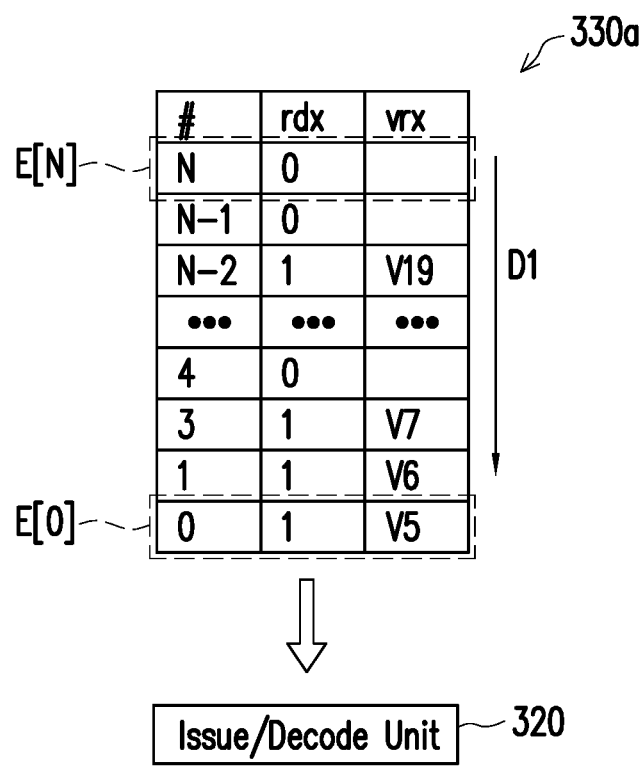
FIG. 3A through 3B illustrate read shifters in accordance with some embodiments.

FIG. 3A illustrates a read shifter 330*a* associated with a read port RD_Px (as shown in the register file 140 of FIG. 2) in accordance with some embodiments. The read port RD_Px may be any one of the read ports RD_0 through RD_PK. The read shifter 330*a* may include a plurality of shifter entries E[0] through E[N] that are shifted every clock cycle in a direction D1. In some embodiments, the number of the shifter entries N in the read shifter 330*a* is determined based on the largest number of the instructions in the pipeline. The shifter entry E[0] is referred to as the bottom shifter entry and the shifter entry E[N] is referred to as the top shifter entry. The read shifter 330*a* may shift out the values of the bottom shifter entry E[0] every clock cycle. In some embodiments, a shifter entry E[k] among the shifter entries E[0] through E[N] is associated with the $k^{th}$ clock cycle, and the shifter entry E[k] may include a read value rdx[k] and a register address value vrx[k]. For example, the shifter entry E[0] includes the read value of rdx[0] which is "1" in FIG. 3A and the register address value vrx[0] which is "v5" in FIG. 3A. The shifter entry E[N] includes the read value rdx[N] which is "0" and the register address value vrx[N] which is a blank register address value. In some embodiments, the read shifter does not shift at all if there is no valid read value (e.g., when rdx[N:0] are all "0"). In some embodiments, the read value of the store instruction may not know until later time during execution. The store instruction in store execution pipeline can send request to read shifter to use a dedicated read port. The preset value rdx[k] in the read port has the higher priority in using the read port, the store instruction must assert the read request until the read value of rdx[k] is "0" in order to get valid store data from the read port. Since store instruction has low performance impact for microprocessor, delaying reading of store data is not an issue.

The read value rdx[k] of the read shifter 330*a* may indicate an availability of the read port RD_Px in the $k^{th}$ clock cycle; and the register address value vrx[k] of the read shifter 330*a* may indicate the address of the register from which the data are read out. For example, when read value rdx[k] of the read shifter 330*a* is a first predetermined value (e.g., "1"), it indicates that the read port RD_Px is busy in the $k^{th}$ clock cycle. When read value rdx[k] of the read shifter 330*a* is a second predetermined value (e.g., "0"), it indicates that the read port RD_Px is available in the $k^{th}$ clock cycle.

In some embodiments, the issue/decode unit 320 may control the issuance of a vector instruction based on the read values stored in the shifter entries E[0] through E[N] of the read shifter 330*a*. For example, if the vector instruction that includes a read operation in $k^{th}$ clock cycle using the read port RD_Px is requested to be issued, the issue/decode unit 320 may stall or issue the vector instruction based on the read value rdx[k] in the read shifter 330*a*. When the read value rdx[k] in the read shifter 330*a* is "0", the issue/decode unit 320 may issue the vector instruction. When the read value rdx[k] in the read shifter 330*a* is "1", the issue/decode unit 320 may stall the vector instruction, and checks the read value rdx[k] in the next clock cycle (or $(k+1)^{th}$ clock cycle). The issuant instruction checks the same read value rdx[k] every clock cycle until the conflict does not exist anymore at which cycle, the issuant instruction will be sent to execution queue 150 in FIG. 2. In this way, the conflict of using the read port RD_Px is prevented by simply checking the read values stored in the read shifter 330*a*. The pipeline control mechanism is simplified with the usage of the read shifter 330*a*. In some embodiments, the number of entries in the read shifter is based on the number of instructions can be in the execution queue and functional unit at one time. For example, the read shifter can check the read port availability for an instruction in the execution queue 150 to the functional unit 160 in cycle 32 in the future if the read shifter has 32 entries.

In some embodiments, each of the shifter entries E[0] through E[N] of the read shifter 330*a* may further store a forwarding information (e.g., a forwarding bit) that is configured to control forwarding operations of the functional units FUNIT_A, FUNIT_B, FUNIT_C in the functional unit module 160. For example, when the forwarding information of a shifter entry indicates that the forwarding is allowed, the logic of the functional unit module 160 or the microprocessor 100 may be configured for forwarding the result data from a functional unit of the previous instruction to a functional unit of subsequent instruction. The functional unit of the previous instruction may be same as or different from the functional unit of the subsequent instruction. As such, the functional unit of subsequent instruction may obtain the result data directly from the functional unit of the previous instruction instead of obtaining the result data from the register file 140. Since the functional unit of subsequent instruction may obtain the result data in one clock cycle earlier from data forwarding, the performance of the microprocessor 100 is improved. As the forwarding information of the issued instruction is included in the read shifter 130, all register file read port control is centralized in the read shifter 130 thus the pipeline control mechanism of the microprocessor 100 is simplified.

Figure 3B:
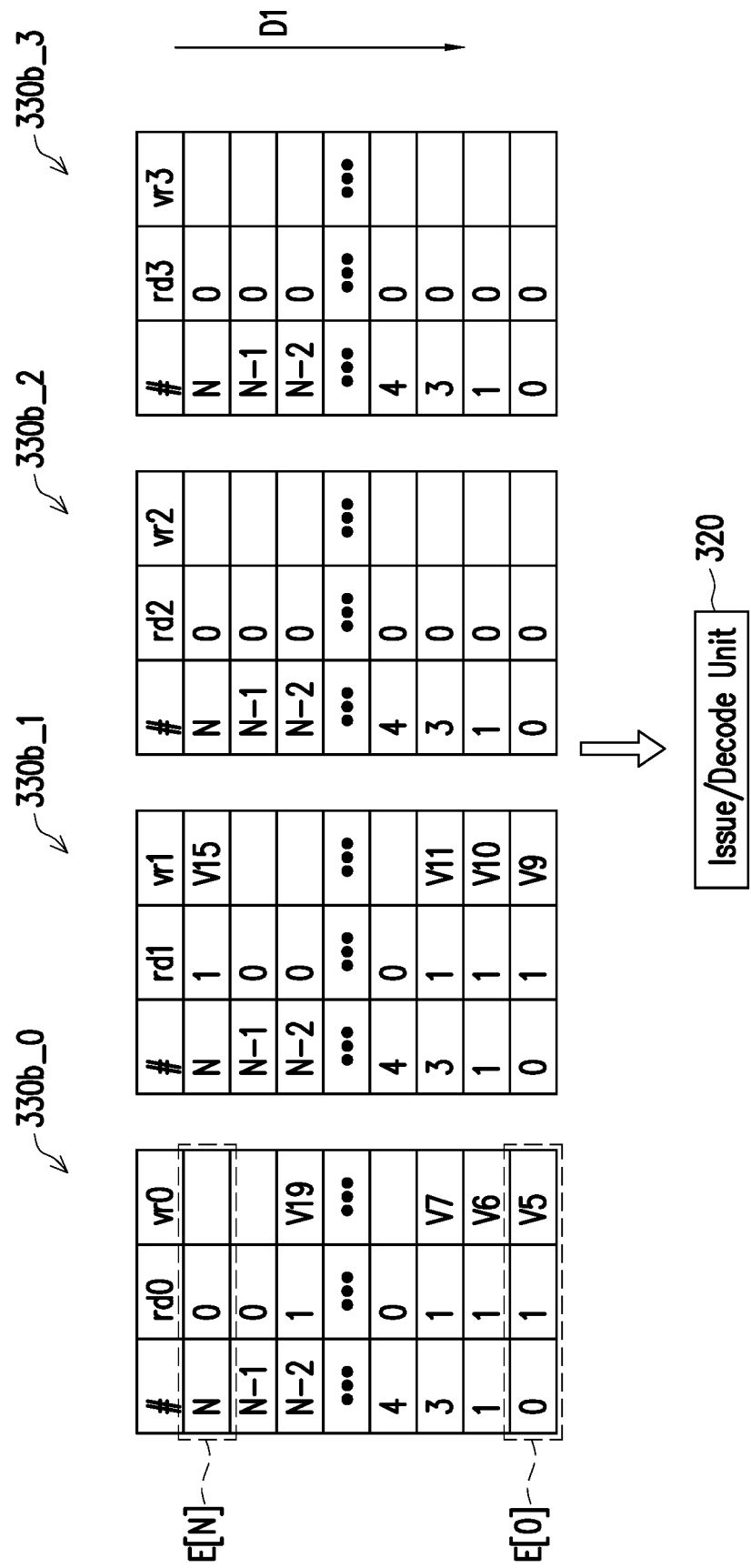

FIG. 3B is illustrates read shifters 330b_0 through 330b_3 that are associated with read ports RD_P0 through RD_P3 (as shown in register file 140 of FIG. 2) in accordance with some embodiments. Each of the read shifters 330b_0 through 330b_3 in FIG. 3B has similar structure and components as the read shifter 330a shown in FIG. 3A. As such, each of the read shifters 330b_0 through 330b_3 may include a plurality of shifter entries E[0] through E[N] that are shifted in the D1 direction every clock cycle. Each shifter entry E[k] of the read shifter 330b_0 may include a read value rd0[k] and a register address value vr0[k]; each shifter entry E[k] of the read shifter 330b_1 may include a read value rd1[k] and a register address value vr1[k]; each shifter entry E[k] of the read shifter 330b_2 may include a read value rd2[k] and a register address value vr2[k]; and each shifter entry E[k] of the read shifter 330b_3 may include a read value rd3[k] and a register address value vr3[k]. The availability of the read ports RD_P0 through RD_P3 may be determined based on the shifter entries E[0] through E[N] of the read shifters 330b_0 through 330b_3, respectively. In some embodiments, the issue/decode unit 320 control the issuance of a vector instruction based on the values stored in the read shifters 330b_0 through 330b_3. The issue/decode unit 320 may check the read values stored in the read shifters 330b_0 through 330b_3 to determine whether to issue or stall a vector instruction, and to determine which read port among the read ports RD_P0 through RD_P3 is used during the execution of the vector instruction. The number of read ports is to minimize the number of read port conflicts for optimal performance, power, and area of the applications.

In some embodiments, the same read port is used for all micro operations of the same vector instruction. In some embodiments, two read ports are used for the vector instruction that requires two operands. In some embodiments, at least one read port among the read ports RD_P0 through RD_P3 is a dedicated read port and the remaining read ports are the shared read ports. The dedicated read port is dedicated for the vector instruction that includes a store instruction, in which the read time of the store instruction is unknown. In some embodiments, the read port RD_P3 that is associated with the read shifter 330b_3 is the dedicated read port; and the other read ports RD_P0 through RD_P2 that are associated with the read shifter 330b_0 through 330b_2 are the shared read ports.

Figure 3C:
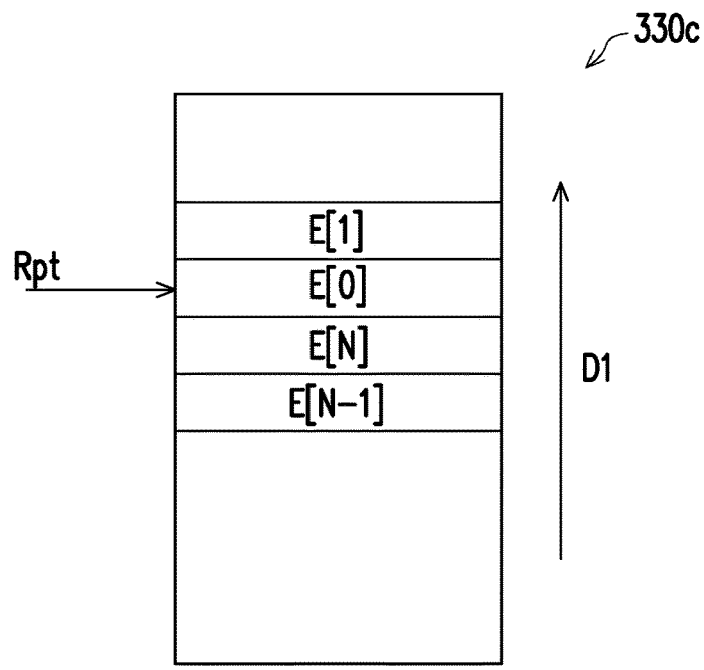
FIG. 3C illustrates a block diagram of a rotating buffer in accordance with some embodiments.

In some embodiments, the read shifters 330a and 330b_0 through 330b_3 shown in FIG. 3A and FIG. 3B may be implemented by a rotating buffer for saving the power consumption. FIG. 3C is a block diagram illustrating a rotating buffer 330c in accordance with some embodiments. The rotating buffer 300c may include a plurality of buffer entries E[0] through E[N] that are configured to store values of the read shifter. In some embodiments, the rotating buffer 300c includes a read pointer Rpt, in which the read point Rpt may indicate the address of the buffer entry from which the stored values are read out which is corresponding to read shifter entry E[0] in FIG. 3A. As the Rpt is increasing, the entry E[0] becomes entry E[N] and the rdx value is reset to "0" to indicate that E[N] is now available. In some embodiments, one buffer entry of the rotating buffer 330c is read out every clock cycle, and the read pointer Rpt may move every clock cycle to indicate the address of the buffer entry that is shifted out. In some embodiments, the Rpt is not increasing if rdx[N:0] are all "0" indicating that there is no data will be read from register file at any time in the future.

A shift operation on the read shifter is power hungry, because all shifter entries must be updated with the new values every clock cycle. When the rotating buffer 330c is used as the read shifter, the read point Rpt may prevent the necessity to update all the shifter entries of the read shifter in every clock cycle. As a result, the power consumption for the read shifter implemented by the rotating buffer is reduced.

Figure 4:
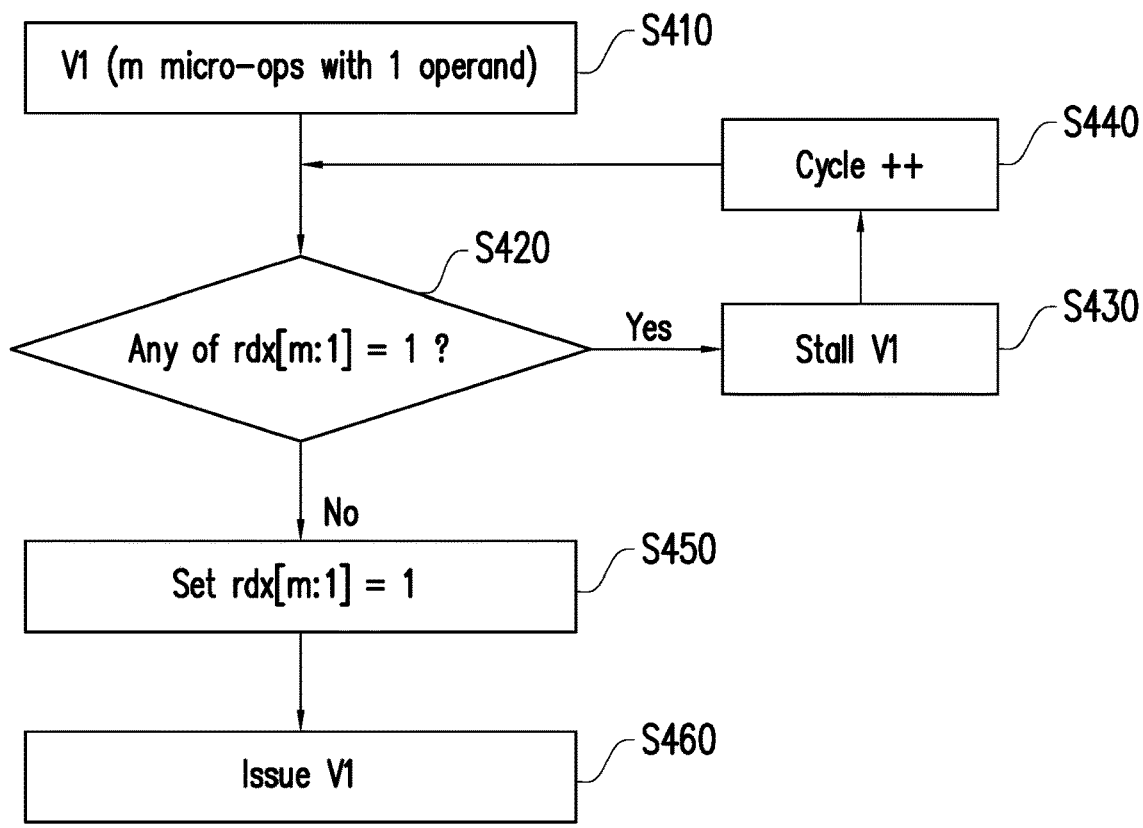
FIG. 4 is a flowchart diagram illustrating an issuance of a vector instruction based on a read shifter in accordance with some embodiments.

FIG. 4 is a flowchart diagram illustrating an issuance of a vector instruction V1 based on read shifter (e.g., read shifter 130 in FIG. 2) in accordance with some embodiments. The vector instruction V1 may include m micro-operations where each micro-operation has one source operand. The micro-operation is executed 1 per clock cycle for m cycles and in each clock cycle the source operand is read from register file 140 of FIG. 2. In some embodiments, the operand is read out from the register file (e.g., register file 140 in FIG. 2) through a read port RD_Px. The vector instruction V1 is provided to the issue/decode unit (e.g., issue/decode unit 120 in FIG. 2) in step 410. In step S420, the issue/decode unit may determine whether any of the read values rdx[m:1] is the first predetermined value (e.g., "1"). When none of the read values rdx[m:1] is the first predetermined value, the vector instruction V1 is issued and all the read values rdx[m:1] are set to a first predetermined value (e.g., "1") in steps S450 and S460. When at least one of the read values rdx[m:1] is the first predetermined value (e.g., "1"), the issue/decode unit stalls the vector instruction V1, and checks again the read value rdx[m:1] in next clock cycle to determine whether to issue or stall the vector instruction V1 in the next clock cycle in steps S430 and S440. The same read value rdx[m:1] that the decode unit will check every clock cycle until the read ports become available for issuing of instruction to the execution queue 150. The issue/decode unit may check the read values in subsequent clock cycles until the vector instruction V1 is issued. The instruction is sent from execution queue 150 to functional unit 160 via bus 151 of FIG. 2, every cycle.

Figure 5:
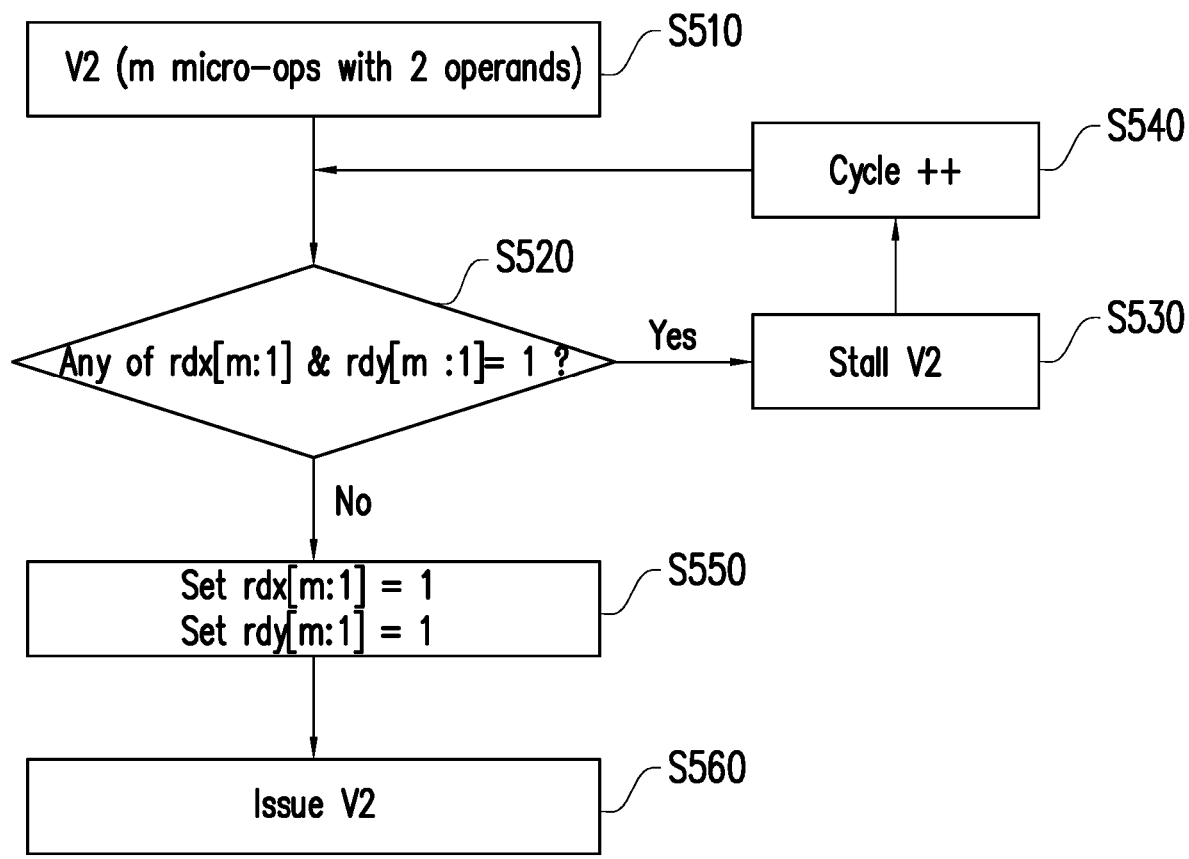
FIG. 5 is a flowchart diagram illustrating an issuance of a vector instruction based on a read shifter in accordance with some alternative embodiments.

FIG. 5 is a flowchart diagram illustrating an issuance of a vector instruction V2 having multiple micro operations where each micro-operation has multiple source operands based on read shifters in accordance with some embodiments. In some embodiments, each of the operands is read out from a read port of the register file (e.g., register file 140 in FIG. 2). As such, when the vector instruction V2 has m micro operations and two operands, two read shifters (e.g., rdx and rdy) associated with two read ports of the register file are used for controlling the issuance of the vector instruction V2.

In step S510, the vector instruction V2 is provided. In step S520, the issue/decode unit may determine whether any of the read values rdx[m:1] and the read values rdy[m:1] is the first predetermined value (e.g., "1"). In other words, the issue/decode unit may check the read values in the m consecutive shifter entries of both the read shifter rdx and the read shifter rdy. When none of the read values rdx[m:1] and the read values rdy[m:1] is the first predetermined value, the vector instruction V2 is issued and all the read values rdx[m:1] and the read values rdy[m:1] are set to the first predetermined value (e.g., "1") in steps S550 and S560. When at least one of the read values rdx[m:1] and the read values rdy[m:1] is the first predetermined value, the issue/decode unit stalls the vector instruction V2, and check again the read values rdx[m:1] and the read values rdy[m:1] in next clock cycle to determine whether to issue or stall the vector instruction V2 in the next clock cycle in steps S530 and S540. The same read values rdx[m:1] and rdy[m:1] that the decode unit will check every clock cycle until the read ports become available for issuing of instruction to the execution queue 150. The issue/decode unit may check the read values of the read shifters rdx and rdy in subsequent clock cycles until the vector instruction V2 is issued.

Figure 6:
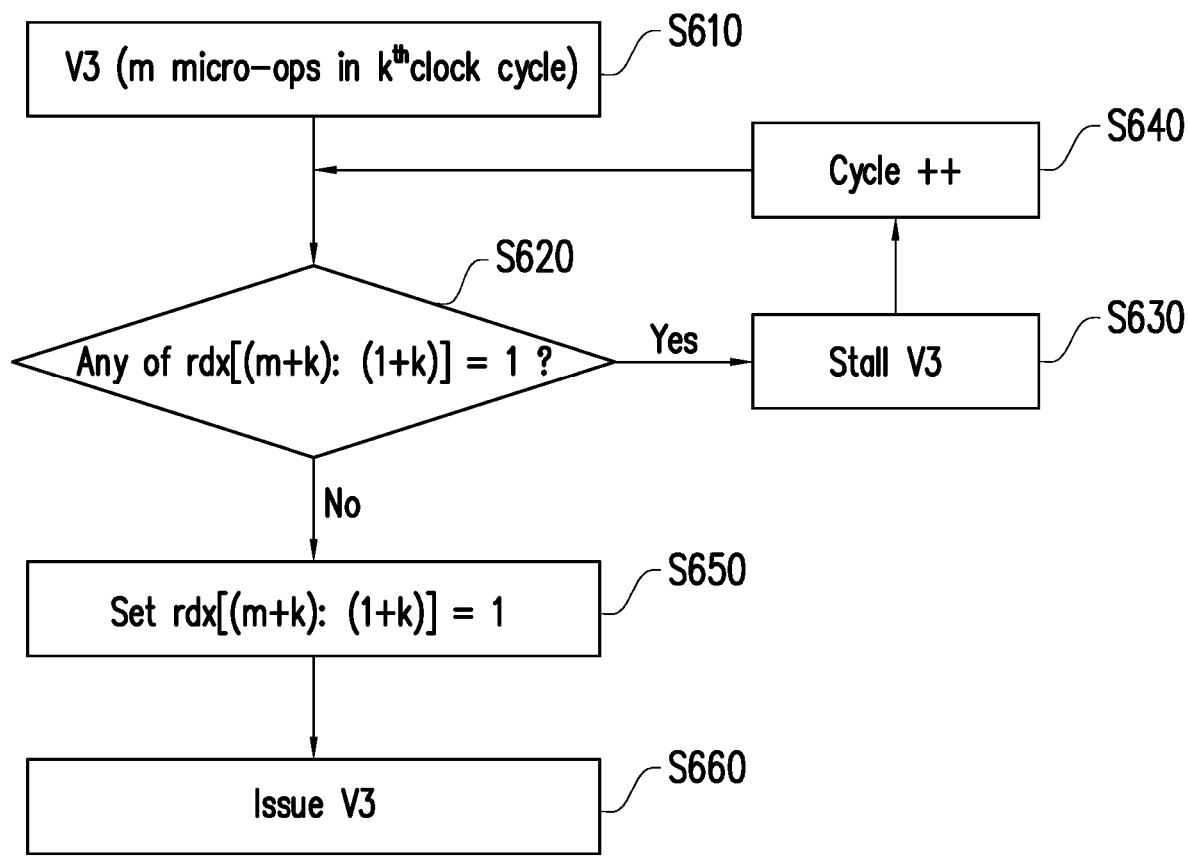
FIG. 6 is a flowchart diagram illustrating an issuance of a vector instruction in $K^{th}$ clock cycle in accordance with some embodiments.

FIG. 6 illustrates an issuance of a vector instruction V3 with read time in $k^{th}$ clock cycle based on a read shifter (e.g., read shifter rdx) in accordance with some embodiments. In step S610, the vector instruction V3 that may have m micro-operations operations where each micro-operation has one source operand. The vector instruction V3 may be issued by the issue/decode unit 120 to the execution unit 150 of FIG. 2 but the vector instruction is sent from the execution unit 150 to the functional unit 160 of FIG. 2 in $k^{th}$ clock cycle when the read shifter 130 controls the read port of the register file 140 to provide the source operand data to the functional unit 160 of FIG. 2. In step S620, the issue/decode unit may determine whether any of the read values rdx[(m+k): (1+k)] in multiple consecutive shifter entries of the read shifter rdx is the first predetermined value (e.g., "1"). When none of the read values rdx[(m+k): (1+k)] is the first predetermined value, the vector instruction V3 is issued and the read values rdx[(m+k): (1+k)] are set to the first predetermined value (e.g., "1") in steps S650 and S660. When at least 1 of the read values rdx[(m+k): (1+k)] is the first predetermined value, the issue/decode unit stalls the vector instruction V3, and check again the read values rdx[(m+k): (1+k)] in next clock cycle to determine whether to issue or stall the vector instruction V3 in the next clock cycle in steps S630 and S640. The same read value rdx[(m+k):(1+k)] that the decode unit will check every clock cycle until the read ports become available for issuing of instruction to the execution queue 150. The issue/decode unit may check the read values of the read shifter rdx in subsequent clock cycles until the vector instruction V3 is issued.

Figure 7:
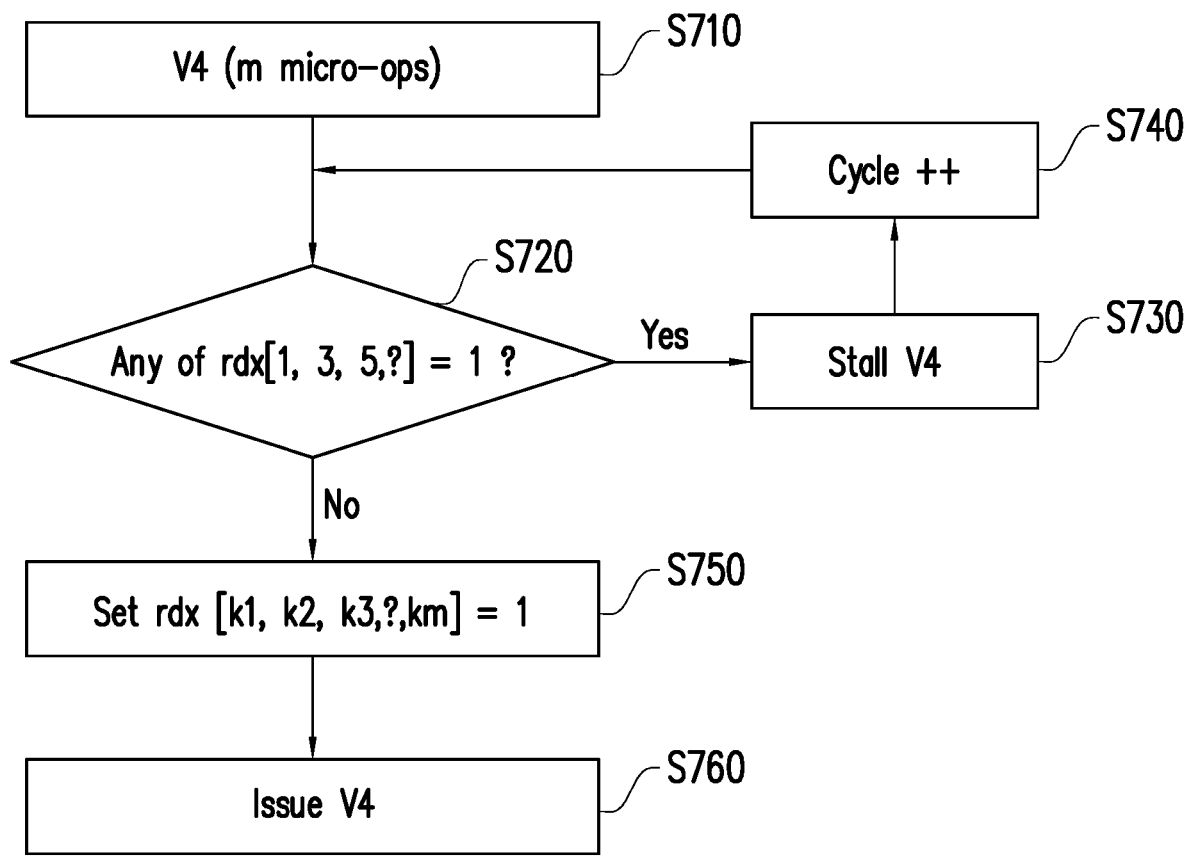
FIG. 7 is a flowchart diagram illustrating an issuance of a vector instruction in accordance with some alternative embodiments.

FIG. 7 illustrates an issuance of a vector instruction V4 based on a read shifter (e.g., read shifter rdx) in accordance with some embodiments. The read values for m micro-operation are not consecutive cycles but with a stride value s. In this case, the read values are rdx[m*s+1, (m−1)*s+1, (m−2)*s+1, . . . , 2s+1, s+1, 1]. In step S710, the vector instruction V4 that may have m micro-operations where each micro-operation has one source operand. In step S720, the issue/decode unit may determine whether any of the read values rdx[k1, k2, k3, . . . , km] in multiple non-consecutive shifter entries of the read shifter rdx is the first predetermined value (e.g., "1"), in which k1, k2, k3 and km are positive integers. When none of the read values rdx[k1, k2, k3, . . . , km] is the first predetermined value, the vector instruction V4 is issued and the read values rdx[k1, k2, k3, . . . , km] are set to the first predetermined value (e.g., "1") in steps S750 and S760. When at least one of the read values rdx[k1, k2, k3, . . . , km] is the first predetermined value, the issue/decode unit stalls the vector instruction V4, and check again the read values rdx[k1, k2, k3, . . . , km] in next clock cycle to determine whether to issue or stall the vector instruction V4 in the next clock cycle in steps S730 and S740. The issue/decode unit may check the read values rdx[k1, k2, k3, . . . , km] of the read shifter rdx in subsequent clock cycles until the vector instruction V4 is issued. Note that when s=0, then this FIG. 7 is the same as FIG. 4.

Figure 8:
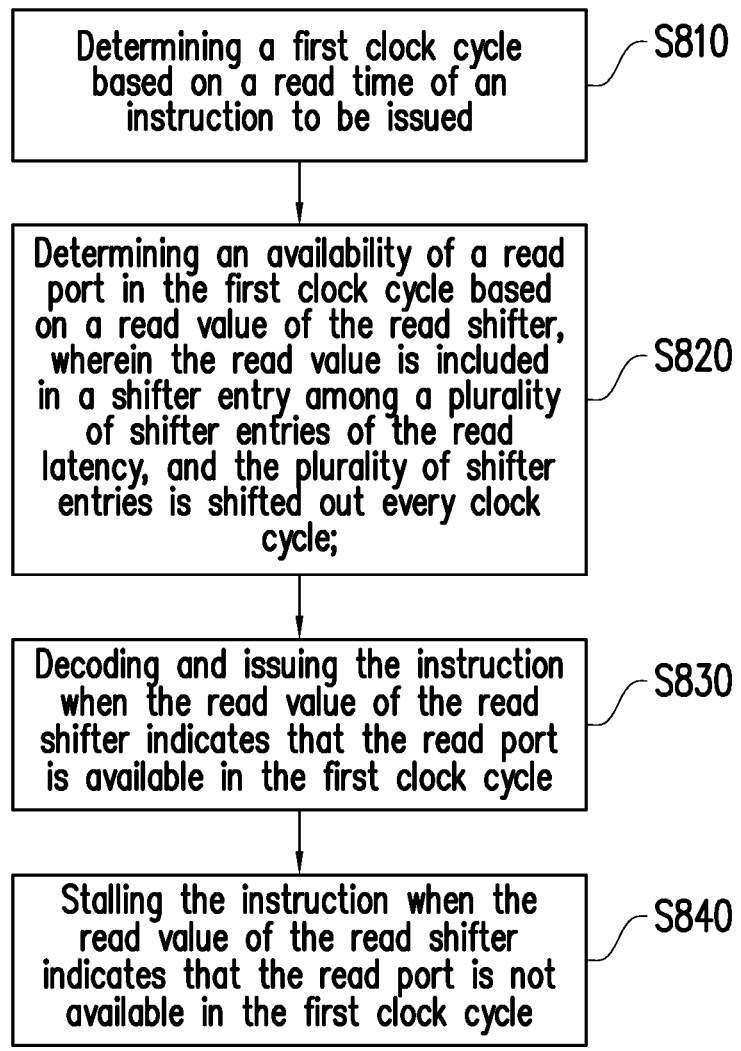
FIG. 8 is a flowchart diagram illustrated a method of controlling an instruction pipeline in accordance with some embodiments.

FIG. 8 illustrates a method of controlling an instruction pipeline in accordance with some embodiments. In step S810, a first clock cycle is determined based on a read time of an instruction to be issued. In step S820, an availability of a read port in the first clock cycle is determined based on a read value of the read shifter, wherein the read value is included in a shifter entry among a plurality of shifter entries of the read latency, and the plurality of shifter entries is shifted out every clock cycle. In step S830, the instruction is decoded and issued when the read value of the read shifter indicates that the read port is available in the first clock cycle. In step S840, the instruction is stalled when the read value of the read shifter indicates that the read port is not available in the first clock cycle.

In accordance with some embodiments of the disclosure, a processor that includes a register file, a read shifter, a decode unit and a plurality of functional units is introduced. The register file includes a read port. The read shifter includes a plurality of shifter entries and is configured to shift out a shifter entry among the plurality of shifter entries every clock cycle. Each of the plurality of shifter entries is associated with a clock cycle and each of the plurality of shifter entries comprises a read value that indicates an availability of the read port of the register file for a read operation in the clock cycle. The decode unit is coupled to the read shifter and is configured to decode and issue an instruction based on the read values included in the plurality of shifter entries of the read shifter. The plurality of functional units is coupled to the decode unit and the register file and is configured to execute the instruction issued by the decode unit and perform the read operation to the read port of the register file.

In accordance with some embodiments of the disclosures, a method of controlling an instruction pipeline is introduced. The method includes steps of determining a first clock cycle based on a read time of an instruction to be issued; determining an availability of a read port in the first clock cycle based on a read value of the read shifter, wherein the read value is included in a shifter entry among a plurality of shifter entries of the read latency, and the plurality of shifter entries is shifted out every clock cycle; decoding and issuing the instruction when the read value of the read shifter indicates that the read port is available in the first clock cycle; and stalling the instruction when the read value of the read shifter indicates that the read port is not available in the first clock cycle.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:
1. A microprocessor, comprising:
a register file, comprising a read port and a plurality of registers having a plurality of register addresses;
a read shifter, comprising a plurality of shifter entries, configured to shift out a shifter entry among the plurality of shifter entries every clock cycle, wherein each of the plurality of shifter entries is associated with a clock cycle and each of the plurality of shifter entries comprises:

a read value that indicates an availability of the read port of the register file for a read operation in the clock cycle;
a register address value, configured to store a register address among the plurality of register addresses for the read operation of the instruction;
a forwarding control bit, configured to control a forwarding operation of the at least one functional unit; and
a functional unit value, configured to indicate from which functional unit result data will be forwarded;
a decode unit, coupled to the read shifter, configured to decode an instruction and issue the instruction based on the read values included in the plurality of shifter entries of the read shifter; and
at least one functional unit, coupled to the decode unit and the register file, configured to execute the instruction issued by the decode unit and to use the read data from the read port of the register file.

2. The microprocessor of claim 1, wherein the read shifter is configured to shift out a bottom shifter entry of the read shifter every clock cycle, wherein the shifted out values of the shifter control the read operation of the register file.

3. The microprocessor of claim 1, wherein
when the read value is a first pre-determined value, the read port of the register file is not available for the read operation in the clock cycle; and
when the read value is a second pre-determined value, the read port of the register file is available for the read operation in the clock cycle.

4. The microprocessor of claim 3, wherein
when a first instruction to be issued is configured to perform a first read operation in a first clock cycle and the read shifter indicates that the read port of the register file is not available in the first clock cycle, the decode unit is configured to stall an issuance of the first instruction, and
when the first instruction to be issued is configured to perform the first read operation in the first clock cycle and the read shifter indicates that the read port of the register file is available in the first clock cycle, the decode unit is configured to issue the first instruction and set the read value of the shifter entry associated with the first clock cycle to the first pre-determined value.

5. The microprocessor of claim 4, wherein
when the decode unit is configured to stall the issuance of the first instruction in the first clock cycle, the decode unit is configured to determine the availability of the read port of the register file in a second clock cycle that is next to the first clock cycle.

6. The microprocessor of claim 1, further comprising:
an instruction unit, coupled to the decode unit, configured to provide the instruction to the decode unit; and
an execution queue, coupled to the decode unit and the at least one functional unit, configured to store issued instructions to a plurality of queue entries of the execution queue and provide the issued instructions stored in the execution queue to the at least one functional unit.

7. The microprocessor of claim 1, wherein
the read shifter is implemented using a rotating buffer, and the rotating buffer comprises:
a read pointer, configured to indicate a buffer address from which an element is read out from the rotating buffer; wherein the read out values control the read operation of the register file.

8. The microprocessor of claim 1, wherein when the read values of the plurality of shifter entries are all the second pre-determined value, the read shifter stops shifting out shifter entry.

9. The microprocessor of claim 1, wherein
the read shifter comprises a plurality of first read shifters, each of the plurality of first read shifters corresponds to one of the plurality of first read ports.

10. The microprocessor of claim 9, wherein
the instruction is a vector instruction that comprises a plurality of micro operations, and
the plurality of micro operations of the vector instruction are controlled by a same first read shifter among the plurality of first read shifters.

11. The microprocessor of claim 9, wherein
the functional unit includes a plurality of functional units, each of the plurality of functional units being configured to perform a predetermined operation, and
one of the plurality of the first read shifters is dedicated to a said predetermined operation functional unit.

12. The microprocessor of claim 11, wherein
one of the plurality of the first read shifters is dedicated to the said predetermined operation functional unit only when there is valid operation in the said predetermined operation functional unit.

13. A method of scheduling a read port of a register file in a microprocessor, comprising:
determining a first clock cycle based on a read time of an instruction to be issued;
determining an availability of the read port in the first clock cycle based on a read value of a read shifter, wherein the read value is included in a shifter entry among a plurality of shifter entries of the read time, and the plurality of shifter entries is shifted out every clock cycle;
decoding and issuing the instruction when the read value of the read shifter indicates that the read port is available in the first clock cycle; and
stalling the instruction when the read value of the read shifter indicates that the read port is not available in the first clock cycle,
wherein each of the plurality of shifter entries of the read shifter further comprises:
a register address value, configured to store a register address among the plurality of register addresses for the read operation of the instruction;
a forwarding control bit, configured to control a forwarding operation of the at least one functional unit; and
a functional unit value, configured to indicate from which functional unit result data will be forwarded.

14. The method of claim 13, further comprising:
accessing read value of a shifter entry of the read shifter every clock cycle, wherein the read values of the shifter control the read operation of the register file.

15. The method of claim 13, wherein
when the read value is a first pre-determined value, the read port of the register file is available for the read operation in the clock cycle; and
when the read value is a second pre-determined value, the read port of the register file is not available for the read operation in the clock cycle.

16. The method of claim 13, further comprising:
setting the read value to the first pre-determined value when the instruction is decoded and issued;

determining whether the read port of the register file is available in a second clock cycle that is next to the first clock cycle; and decoding and issuing the instruction when the read value of the read shifter indicates that the read port is available in the second clock cycle.

17. The method of claim 13, wherein the instruction is a vector instruction that comprises a plurality of micro operations, and the micro operations are included in shifter entries of the read shifter.

18. The method of claim 13, wherein the read shifter comprises a plurality of first read shifters, each of the plurality of first read shifters corresponds to one of the plurality of first read ports, the instruction is a vector instruction that comprises a plurality of micro operations, and the plurality of micro operations of the vector instruction are included in a same first read shifter among the plurality of first read shifters.

19. The method of claim 13, further comprising:

determining whether read values of the plurality of shifter entries are all the first pre-determined value; and stopping shifting out the shifter entry when the read values of the plurality of shifter entries are all the second pre-determined value.

20. The method of claim 13, further comprising:

controlling a forwarding operation of at least one functional unit of the microprocessor according to the forwarding control bit stored in each shifter entry of the read shifter.

21. A data processing system, comprising:

a microprocessor, wherein said microprocessor includes:

a register file, comprising a read port;

a read shifter, comprising a plurality of shifter entries, configured to shift out a shifter entry among the plurality of shifter entries every clock cycle, wherein each of the plurality of shifter entries is associated with a clock cycle and each of the plurality of shifter entries comprises:

a read value that indicates an availability of the read port of the register file for a read operation in the clock cycle;

a register address value, configured to store a register address among the plurality of register addresses for the read operation of the instruction;

a forwarding control bit, configured to control a forwarding operation of the at least one functional unit; and a functional unit value, configured to indicate from which functional unit result data will be forwarded;

an instruction unit, configured to provide an instruction;

a decode unit, coupled to the read shifter and the instruction unit, configured to decode the instruction and issue the instruction based on the read values included in the plurality of shifter entries of the read shifter;

an execution queue, coupled to the decode unit, configured to store issued instructions to a plurality of queue entries of the execution queue;

at least one functional unit, coupled to the execution queue and the register file, configured to execute the issued instructions and to use the read data from the read port of the register file;

a main memory, coupled to the microprocessor;

a bus bridge, coupled to the microprocessor; and an input/output device, coupled to the bus bridge.

22. The data processing system of claim 21, wherein the read shifter is configured to shift out a bottom shifter entry of the read shifter every clock cycle, wherein the shifted out values of the shifter control the read operation of the register file.

23. The data processing system of claim 21, wherein when the read value is a first pre-determined value, the read port of the register file is not available for the read operation in the clock cycle; and when the read value is a second pre-determined value, the read port of the register file is available for the read operation in the clock cycle.

24. The data processing system of claim 23, wherein when a first instruction to be issued is configured to perform a first read operation in a first clock cycle and the read shifter indicates that the read port of the register file is not available in the first clock cycle, the decode unit is configured to stall an issuance of the first instruction, and when the first instruction to be issued is configured to perform the first read operation n the first clock cycle and the read shifter indicates that the read port of the register file is available in the first clock cycle, the decode unit is configured to issue the first instruction and set the read value of the shifter entry associated with the first clock cycle to the first pre-determined value.

25. The data processing system of claim 21, wherein when the read values of the plurality of shifter entries are all the second pre-determined value, the read shifter stops shifting out the shifter entry.

* * * * *